W. B. Guy,
Gas and Water Pipe,
N°. 45,491. Patented Dec. 20, 1864.
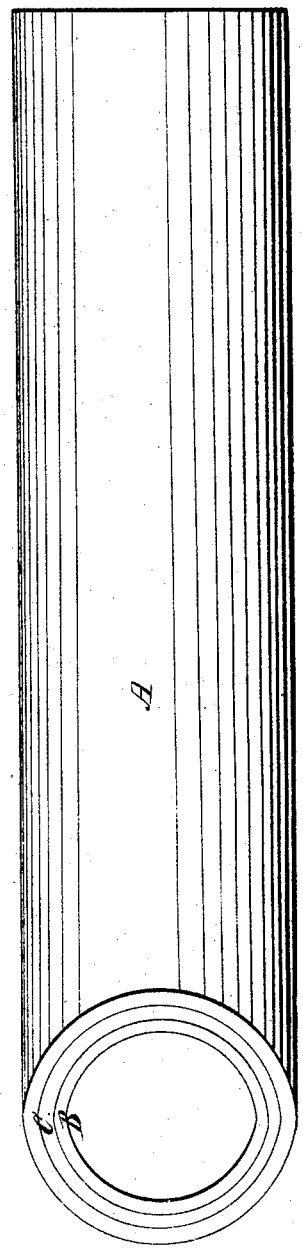
Witnesses:
Fred B. Ginn,
J. K. Somes.
Inventor:
William B. Guy,
D. E. Somes & Co.
Attorneys

UNITED STATES PATENT OFFICE.

WILLIAM B. GUY, OF BOSTON, MASSACHUSETTS, ASSIGNOR TO E. H. AUSTIN, OF MADBURY, NEW HAMPSHIRE.

IMPROVEMENT IN GAS AND WATER PIPES.

Specification forming part of Letters Patent No. 45,491, dated December 20, 1864.

*To all whom it may concern:*

Be it known that I, WM. B. GUY, of Boston, in the county of Suffolk and State of Massachusetts, have invented a new and useful Improvement in Gas and Water Pipes; and I do hereby declare the following to be a full and exact description of the same, reference being had to the accompanying drawing, and to the letters of reference marked thereon.

The object of my invention is to construct pipes for conveying gas and water that will not be liable to leakage, and will be more durable than those generally in use.

To accomplish this object I place in the inside of a pipe of any suitable material a tube or lining of glass, with a space between this inside tube or lining and the inner surface of the pipe, varying in width according to the size of the pipe, which space I fill with bitumen or other elastic or plastic material.

In the accompanying drawing, A represents a section of gas or water pipe made according to my plan; B, the inner tube of glass; C, the bitumen, or other substance between the glass tube and the inner surface of the pipe.

The advantages which I claim for pipes constructed in this manner are as follows: First, the glass lining secures the pipes from the corrosive action of the gas or water conveyed in them, and therefore renders them more durable; second, if used for water-pipes the water conveyed in them will be pure and free from any taint caused by corrosion; third, the substance between the pipe and the glass lining prevents the latter from being broken by the pipe being contracted or expanded by the action of cold or heat; it will also in water-pipes form a protection against cold, rendering the water less liable to freeze and the pipes to burst from this cause.

What I claim as new and of my invention, and desire to secure by Letters Patent, is—

1. The inner tube of glass separated from the pipe, in the manner and for the purpose set forth.

2. Any elastic or plastic substance placed between the pipe and inner tube or lining, substantially as and for the purpose described.

WM. B. GUY.

Witnesses:
MARCUS MARX,
D. C. WIGGIN.